United States Patent [19]

Grau

[11] Patent Number: 4,991,952
[45] Date of Patent: Feb. 12, 1991

[54] PAIR OF GLASSES WITH INCLINABLE TEMPLES

[75] Inventor: Werner Grau, Aichach-Untermauerbach, Fed. Rep. of Germany

[73] Assignee: Uvex Winter Optik GmbH, Fed. Rep. of Germany

[21] Appl. No.: 348,778

[22] Filed: May 8, 1989

[30] Foreign Application Priority Data

May 13, 1988 [DE] Fed. Rep. of Germany ... 8806308[U]

[51] Int. Cl.$^5$ ............................................... G02C 5/14
[52] U.S. Cl. ..................................................... 351/120
[58] Field of Search ........................ 351/120, 111, 119

[56] References Cited

U.S. PATENT DOCUMENTS 3,907,410  9/1975  Richmond et al. ............... 351/120
4,129,362  12/1978  Lorenzo ............................ 351/120

Primary Examiner—Paul M. Dzierzynski
Attorney, Agent, or Firm—Laff, Whitesel, Conte & Saret

[57] ABSTRACT

A pair of glasses with inclinable temples, each temple being articulated pivotally around a swivel bearing on a holder connected to the frame, is designed such that the holder has an approximately plate-like basic body, that a recess open to the inside and backwards is provided in the holder, that a plate-like appendage is integrally provided at the front end of the temple, locking ribs being arranged adjacent to a radial outer edge of this appendage and engaging with corresponding locking ribs adjacent to an inner edge of the recess of the holder, and that a swivel bearing bolt passes through the appendage of the temple and the holder adjacent to its recess, thus achieving an inclination adjustment both technically satisfying and functional, on the one hand, and, on the other hand, an esthetically attractive and fashionable styling.

2 Claims, 1 Drawing Sheet

PAIR OF GLASSES WITH INCLINABLE TEMPLES

FIELD OF THE INVENTION

The invention is directed to a pair of glasses with inclinable temples, each temple being articulated pivotably around a swivel bearing on a holder connected to the glass frame, and a locking device with a plurality of locking ribs positioned concentrically to the swivel bearing being provided at the swivel bearing to keep the temple in a certain position of inclination.

BACKGROUND OF THE INVENTION

Glasses with inclinable temples and a locking device for keeping the temple in a certain angle of inclination are known in a variety of embodiments.

All these constructions deal with the problem that the manufacturing of the necessary components should be feasible at little expense, at the same time ensuring good functioning.

Glasses with locking devices positioned radially outwards are for instance known from safety work goggles. In these safety work goggles the swivel bearing is provided between a plate-like swivel bearing bolt integral with the box-like frame and a recess at the end of the temple engaging the bolt.

A design of this kind, which is basically advantageous, is suitable for safety work goggles due to the fact that a comparatively wide frame is available and necessary for technical reasons. Such a design is not suitable for sun glasses of fashionable design.

SUMMARY OF THE INVENTION

It is accordingly the object of the present invention to embody glasses of the above generic type in such a way, while retaining an esthetically attractive and fashionable design, that a technically satisfying and functioning inclination adjustment is achieved.

This object is attained in accordance with the invention by providing a recess open to the inside and backwards in the holder, by integrally providing the front end of the temple with a plate-like appendage, locking ribs being arranged adjacent to a radial outer edge of this appendage, which locking ribs engage with corresponding locking ribs on an inner edge of the recess of the holder, and by providing a swivel bearing bolt which passes through the appendage of each temple and of each holder at its recess.

Due to the flat overlapping of the temple recess and the holder, which has a reduced thickness as a result of the recess in this overlapping area, a rather elegant styling is attainable. Due to the comparatively large radial distance between the locking ribs forming the locking device and the swivel axis defined by the swivel bearing bolt, the adjustment is made easy and at the same time a good locking effect is achieved in the locked-in final position. Moreover, the holder can take up a hinge bolt at its free front edge, thus securing the temples to the frame in an inwards pivotal manner.

In a further embodiment of the invention the swivel bolt is arranged adjacent to the lower edge and the locking ribs are arranged adjacent to the upper edge of the recess. Thus a maximum radial distance is achieved along with a swivel capacity that complies with physical needs.

It is preferably provided that a recess, which is outwards and backwards open, is equally arranged on the outside of the holder, that a second plate-like appendage extending parallel to the first appendage is arranged at the front end of the temple, and that this appendage engages with the outer recess of the holder.

Thus, excellent guidance is achieved between holder and temple, with the actual swivel bearing being covered by the two plate-like appendages of the temple, so that an extraordinarily elegant styling is realized.

It is advantageously provided that the swivel bearing bolt also passes through the second appendage so that a reliable supporting is achieved.

Further advantages and features of the invention will become apparent from the ensuing description of a preferred embodiment taken in conjunction with the drawing.

BRIEF DESCRIPTION OF THE PREFERRED EMBODIMENT

Figure 1:
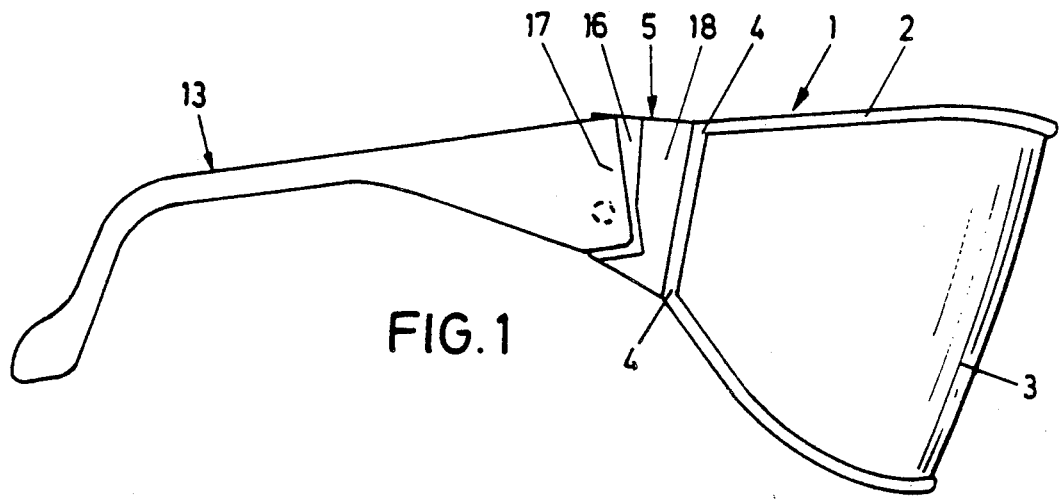
FIG. 1 is a side view of glasses according to the invention.

A pair of glasses 1 according to the invention comprises a frame 2 and sight pieces S in a per se known manner. Swivel bearings not shown in detail are provided at both outer ends 4 of the frame 2, into which bearings holders 5 engage with a recess 6 and are pivotally supported by means of supporting bolts equally not shows in the drawing.

Figure 2:
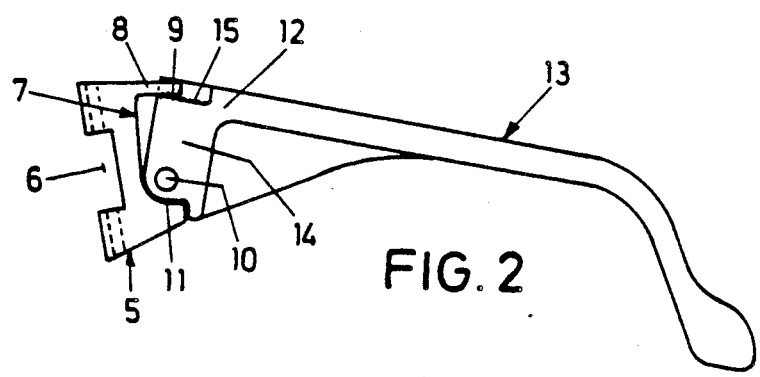
FIG. 2 is a view of a holder and a temple in an aspect turned by 180° as compared with the view of FIG. 1.
Figure 3:
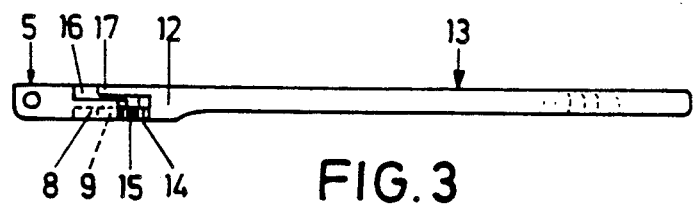
FIG. 3 is a view of the holder and the temple.

The holders 5 have a plate-like basic body, which at its inner side shown in FIG. 2, is provided with a recess 7 open to the inside and backwards.

At the upper edge 8 of the recess 7, adjacent to a protrusion 9, a plurality of locking ribs are provided which are arranged concentrically and extend parallel to a swivel bearing bolt 10 located adjacent to the lower edge 11 of the recess 7 and passing through a bore of the holder 5 provided within the recess 7.

The front end 12 of the temples 13 is integrally provided with a plate-like appendage 14 which engages with the recess 7 and to which a swivel bearing bolt 10 is secured. At the upper edge of the appendage 14 locking ribs 15 are equally arranged running parallelly and concentrically to the swivel bearing bolt 10 and engaging with the locking ribs 9 of the holder 5, so that upon swivelling of the temple 13 around the swivel bearing bolt 10 relative to the holder 5 the locking ribs 15 mesh with the locking ribs 9 and an adjusted position of inclination is arrested.

On the outside of the holder 5 a recess 10 is provided which, extending flatly, is open upwards and backwards. A second appendage 17 of the temple 13 engages with this recess 10, which appendage 17 is visible in the view of FIG. 1 and extends parallel to the plate-like appendage 14 of the view according to FIG. 2, so that the section of the holder 5 tapered in thickness by the recesses 7 and 16 is placed between the appendages 14 and 17.

The total thickness of this area plus that of the appendages 14 and 17 corresponds to the thickness of the basic body 18 and the holder 5, so that the temple 13 with its appendages 14 and 17 passes smoothly and without intervals into the basic body 18 of the holder 5.

As can be seen in particular from FIG. 1, a very elegant and fashionable styling may be achieved by the design according to the invention, while at the same time reliable working is attained.

What is claimed is:

1. A pair of glasses with inclinable temples, each temple being articulated pivotally around a swivel bearing on a holder connected to the frame, and a locking device with a plurality of locking ribs positioned concentrically to the swivel bearing, said locking device being provided adjacent to the swivel bearing for keeping the temple in a certain position of inclination, wherein said holder (5) has a first approximately plate-like basic body (18), a recess (7) open only to the inside and facing in a backward direction, and said recess being provided in the holder (5), wherein a plate-like appendage (14) is integrally provided at the front end of the temple (12), first locking ribs (15) adjacent to a radial outer edge of said appendage (14), corresponding locking ribs (9) being integral with said holder (5) at an inner edge (8) of the recess (7) of the holder (5), said first locking and corresponding locking ribs being positioned to engage each other, a swivel bearing bolt (10) passing through the appendage (14) of the temple (13) and the holder (5) adjacent to its recess (7), the swivel bearing bolt (10) being arranged adjacent to the lower edge (11) and the locking ribs (9) being arranged adjacent to the upper edge (8) of the recess (7), the outside of the holder (5) being equally provided with a recess (16) open only to the outside and facing in a backward direction, a second plate-like appendage (17) extending parallel to the first plate-like appendage at the front end of the temple (12), and said second plate-like appendage (17) engaging the outer recess (16) of the holder (5), thus that the section of said holder (5) tapered in thickness by said recesses (7, 16) is placed between said appendages (14, 17), the total thickness of the area of said appendages (14, 17) corresponding to the thickness of said basic body (18) of said holder (5).

2. A pair of glasses according to claim 1, wherein the swivel bearing bolt (10) passes through the second appendage (17).

* * * * *